(12) United States Patent
Lee et al.

(10) Patent No.: US 9,426,121 B2
(45) Date of Patent: Aug. 23, 2016

(54) ADAPTIVE PROBABILISTIC PACKET FILTERING ROUTER AND METHOD THEREOF

(71) Applicant: Korea University Research and Business Foundation, Seoul (KR)

(72) Inventors: Heejo Lee, Seoul (KR); Dongwon Seo, Anyang-si (KR)

(73) Assignee: KOREA UNIVERSITY RESEARCH AND BUSINESS FOUNDATION, Seoul (KR)

( * ) Notice: Subject to any disclaimer, the term of this patent is extended or adjusted under 35 U.S.C. 154(b) by 106 days.

(21) Appl. No.: 14/308,890

(22) Filed: Jun. 19, 2014

(65) Prior Publication Data

US 2014/0380459 A1  Dec. 25, 2014

(30) Foreign Application Priority Data

Jun. 20, 2013  (KR) .................. 10-2013-0071147

(51) Int. Cl.
G06F 15/16 (2006.01)
G06F 7/04 (2006.01)
H04L 29/06 (2006.01)

(52) U.S. Cl.
CPC ........ H04L 63/0227 (2013.01); H04L 63/1441 (2013.01)

(58) Field of Classification Search
CPC ............ H04L 63/0227; H04L 63/1441; H04L 63/0263
USPC .......................................................... 726/13
See application file for complete search history.

(56) References Cited

FOREIGN PATENT DOCUMENTS

KR 10-2006-0128734 A 12/2006
KR 10-1228288 B 1/2013

OTHER PUBLICATIONS

Bhavani, et.al, An Efficient IP Traceback Through Packet Marking Algorithm, International Journal of Network Security & Its Applications (IJNSA), vol. 2, No. 3, [online] Jul. 2010 [retrieved on Jun. 29, 2015]/ Retrieved from the internet<URL: http://airccse.org/journal/nsa/0710ijnsa09.pdf>.*
Park, Scalable Protection Against Ddos and Worm Attacks, Purdue University Sponsored by DARPA Order No. M097, [online] AFRL-IF-RS-TR-2004-100 Apr. 2004 [retrieved on Jun. 30, 2015]. Retrieved from the internet:URL:http://www.researchgate.net/publication/235150642_Scalable_Protection_Against_DDOS_and_Worm_Attacks>.*

(Continued)

*Primary Examiner* — Eleni Shiferaw
*Assistant Examiner* — David Massie
(74) *Attorney, Agent, or Firm* — Pearne & Gordon LLP

(57) ABSTRACT

A router is provided. The router includes a packet marking unit that inserts marking information generated based on an address of the router into a packet received by the router, according to a packet marking probability that is dynamically set, and a marking probability determination unit that calculates filtering efficiency of the router, and determines the packet marking probability based on the filtering efficiency. The marking information is used to obtain the address of the router by a device that has received the packet containing the marking information.

8 Claims, 9 Drawing Sheets

(56) References Cited

OTHER PUBLICATIONS

Defrawy, et.al, Optimal Allocation of Filters against DDoS Attacks, Information Theory and Applications Workshop, 2007, vol., No., pp. 140,149, [online] Jan. 29 2007-Feb. 2 2007 [retrieved on Jun. 29, 2015]. Retrieved from the internet:<URL: http://ieeexplore.ieee.org/stamp/stamp.jsp?tp=&arnumber=4357573&isnumber=4357548>.*

Seo, et.al, PFS: Probabilistic Filter Scheduling Against Distributed Denial-of-Service Attacks, 36th Annual IEEE Conference on Local Computer Networks [online] LCN 2011, Bonn [retrieved on Jun. 30, 2015]. Retrieved from the internet:<URL: http://ieeexplore.ieee.org/stamp/stamp.jsp?tp=&arnumber=6114645>.*

\* cited by examiner

FIG. 8

$$HOP = \frac{h_{max} - h}{h_{max}}, \quad \sim e1$$

$$RES = \frac{q_{max} - q}{q_{max}} \quad \sim e2$$

$$DEG = \frac{k}{k_{avg}} \quad \sim e3$$

$$DEG = \sum_{s} \sum_{s \neq d} P(m; s, d) \quad \sim e4$$

$$mp = p_d + (w_{hop} \cdot HOP) + (w_{res} \cdot RES) + (w_{deg} \cdot DEG) \sim e5$$

ADAPTIVE PROBABILISTIC PACKET FILTERING ROUTER AND METHOD THEREOF

CROSS-REFERENCE TO RELATED APPLICATION

This application claims priority to Korean Patent Application No. 10-2013-0071147 filed on Jun. 20, 2013, which is incorporated herein by reference in their entirety.

TECHNICAL FIELD

The embodiments described herein pertain generally to a packet filtering router and a method thereof.

BACKGROUND

A distributed denial-of-service (DDoS) attack is a representative network attack and may seriously damage networks. Thus, an effective method for defending the DoS attack is necessary.

As described later with reference to FIG. 1, methods for defending network attacks can be classified by defense point, and it is efficient to defend network attacks at a router among the various defense points.

This method stores filters, which are a kind of rules for blocking attack traffic, in a router and blocks packets corresponding to particular traffic by using the filters.

A filtering router, which can propagate filters fast and is compatible with conventional systems so as to be convenient in installation and use, and a method, which can effectively blocks packets by using the filtering router, are necessary.

With respect to the example embodiments described herein, Korean Patent Application Publication No. 10-2006-0128734 ("Adaptive Defense against Various Network Attacks") describes adaptively adjusting attack sensitivity of a filter depending on various standards.

In addition, Korean Patent No. 10-1228288 ("Network Monitoring Method and Apparatus therefor") describes adaptively adjusting standards for blocking and controlling packet traffic flow.

SUMMARY

In view of the foregoing, example embodiments provide an effective packet filtering router and a method thereof.

In one example embodiment, a router is provided. The router includes a packet marking unit that inserts marking information generated based on an address of the router into a packet received by the router, according to a packet marking probability that is dynamically set, and a marking probability determination unit that calculates filtering efficiency of the router, and determines the packet marking probability based on the filtering efficiency. The marking information is used to obtain the address of the router by a device that has received the packet containing the marking information.

In another example embodiment, a host connected to a network is provided. The hose, when a received packet is determined to be a packet of traffic that should be blocked, the host identifies from marking information contained in the packet a router located on a transmission path of the packet, and transmits a filter or a filter request for blocking the traffic to the router, and the marking information is generated by the router based on an address of the router, according to a packet marking probability that is set by the router based on the router's filtering efficiency calculated by the router.

In still another example embodiment, a method for filtering a packet is provided. The method includes calculating filtering efficiency of a router and determining a packet marking probability based on the filtering efficiency, inserting marking information generated based on an address of the router into a packet received by the router, based on the packet marking probability, transmitting, by a device, a filter or a filter request to the router by using the address of the router calculated based on the marking information, blocking, by the router, a packet using the filter, propagating, by the router, the filter to another router, and determining whether to use or drop the filter.

In accordance with the example embodiments, network attacks can be quickly and effectively blocked.

The example embodiments set a higher packet marking probability for a filtering router having higher filtering efficiency to promptly send a filter or a filter request to the corresponding filtering router when an attack is sensed. Thus, the example embodiments can propagate filters faster than conventional technologies.

Since the victim entity sends filters directly to an optimum filtering router with the highest filtering efficiency, attack traffic on the victim entity can be reduced by 78%.

In addition to the attack on the victim entity, attacks on links can also be defended.

Since the filtering router in accordance with the example embodiments is compatible with legacy routers and existing protocols (e.g.: IPv4), it can be easily installed and used in a current network. That is, installation and operation costs are low.

The foregoing summary is illustrative only and is not intended to be in any way limiting. In addition to the illustrative aspects, embodiments, and features described above, further aspects, embodiments, and features will become apparent by reference to the drawings and the following detailed description.

BRIEF DESCRIPTION OF THE DRAWINGS

In the detailed description that follows, embodiments are described as illustrations only since various changes and modifications will become apparent to those skilled in the art from the following detailed description. The use of the same reference numbers in different figures indicates similar or identical items.

FIG. 8 illustrates an example for calculation of packet marking probability in accordance with an example embodiment;

DETAILED DESCRIPTION

Figure 1:
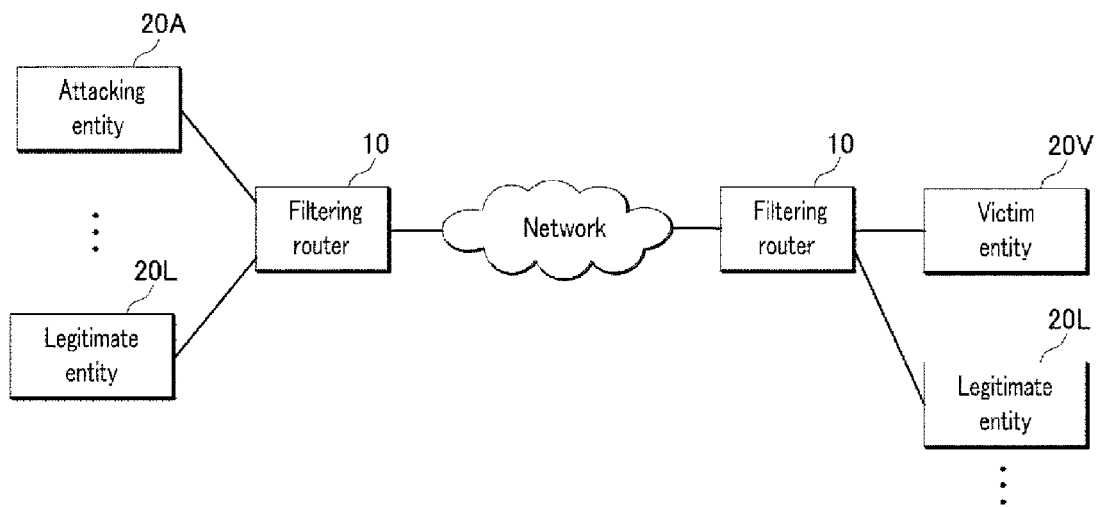
FIG. 1 illustrates a network including an adaptive probabilistic packet filtering router in accordance with an example embodiment.

Hereinafter, example embodiments will be described in detail with reference to the accompanying drawings so that inventive concept may be readily implemented by those skilled in the art. However, it is to be noted that the present disclosure is not limited to the example embodiments but can be realized in various other ways. In the drawings, certain parts not directly relevant to the description are omitted to enhance the clarity of the drawings, and like reference numerals denote like parts throughout the whole document.

Throughout the whole document, the terms "connected to" or "coupled to" are used to designate a connection or coupling of one element to another element and include both a case where an element is "directly connected or coupled to" another element and a case where an element is "electronically connected or coupled to" another element via still another element. In addition, the term "comprises or includes" and/or "comprising or including" used in the document means that one or more other components, steps, operations, and/or the existence or addition of elements are not excluded in addition to the described components, steps, operations and/or elements.

FIG. 1 illustrates a network including an adaptive probabilistic packet filtering router (hereinafter, the "filtering router") in accordance with an example embodiment.

The network may be the Internet or any other type of a network. The network includes at least one filtering router 10 in accordance with an example embodiment, and may include at least one legacy router (not illustrated). The legacy router means a conventional router, which does not have the adaptive probabilistic packet filtering function in accordance with the example embodiment of the present disclosure. That is, since the filtering router 10 in accordance with the example embodiment is compatible with a legacy router, it can be easily installed and operated in a conventional network.

Hosts 20L, 20A, 20V are any devices or systems connected to the network, and may be, for example, servers or clients. For convenience, a host executing a network attack (e.g.: a denial-of-service attack) on other hosts will be referred to hereinafter as an attacking entity 20A, a host to be attacked as a victim entity 20V, and other hosts as a legitimate entity 20L.

There have been researches on various methods for defending a distributed denial-of-service (DDoS) attack, which is one of representative network attacks. Based on defense points, such defending methods can be classified into blocking at the attacking entity 20A, blocking at the victim entity 20V, and blocking at an intermediate network connecting the attacking entity 20A and the victim entity 20V. The blocking at the attacking entity 20A, i.e., the source of an attack, would be the most efficient, because malicious codes are blocked before they widely spread. However, designing and adopting such blocking methods are difficult. The blocking at the victim entity 20V is problematic in that the scope of defense is limited to the victim entity 20V or its neighboring small-sized networks. Accordingly, the example embodiment described herein provides a method for blocking attacks at an intermediate location.

To this end, the example embodiment uses a router, because the router can be a good defense point that can efficiently defend both attacks on the victim entity 20V and on network links. The filtering router 10 prevents attack packets from spreading into the network or reaching the victim entity 20V, by using filters. That is, a filter is a kind of rules for blocking undesired traffic flow and determines which packets will be dropped or forwarded. The filtering router 10 drops or passes packets based on filters that the filtering router 10 has.

In such a filter-based defense technique, many filtering routers exist between the attacking entity 20A and the victim entity 20V, and filters may not be properly propagated to the network or many filtering routers may have the same filter. Accordingly, efficient filter propagation and filter management are important in the filter-based defense.

Active Internet Traffic Filtering (AITF), which is one of conventional filter-based defense techniques, uses a record route to propagate filters, and uses a rate limiting technique to manage the number of filters. However, since the record route needs to use the IP option, it is not compatible with many legacy routers which have been installed and used in current networks. This is because the legacy routers do not provide the IP option. Further, though the rate limiting reduces the number of filters, it does not determine which filters will be installed or will not be installed. In addition, since filter propagation is accomplished by hop-by-hop, a speed of propagation of filters that block the attacking entity 20A would be slow, and thus, the attack could not be promptly blocked when many filtering routers 10 exist between the attacking entity 20A and the victim entity 20V.

Accordingly, it is necessary to resolve three problems: how to propagate filters along attack paths (path identification); how to propagate filters so as to be installed in the filtering routers 10 (filter propagation); and how to manage filters with limited resources of the filtering routers 10 (filter management).

These three problems may be defined as filter scheduling problems. The filtering routers 10 in accordance with an example embodiment resolve the filter scheduling problems by using adaptive packet marking and a filter scheduling policy.

For identification of attack paths, the filtering routers 10 in accordance with an example embodiment insert marking information generated based on addresses of the filtering routers 10 into unused IP header fields according to adaptively calculated marking probability. The marking probability dynamically varies depending on filtering efficiency. The filtering efficiency may be determined based on, for example, how close the filtering routers 10 are to the attacking entity 20A, how many filters the filtering routers 10 can accommodate, and how many links the filtering routers 10 have. Since the victim entity 20V receives the marking from the filtering routers 10, which have higher filtering efficiency and thus have higher marking probability, filters can first reach the more efficient filtering routers 10. Accordingly, the example embodiment is advantageous in propagating filters faster than conventional technologies.

In addition, the filtering routers 10 in accordance with an example embodiment select filters according to the filter scheduling policy, to prevent overhead that may occur due to overly many filter requests. The filter scheduling policy determines which filters should be installed in the filtering routers 10 and which filters should be ejected from the filtering routers 10. The filtering routers 10 may hold filters being actively used and eject useless filters, by calculating filter scores (priority) depending on how often and how recently its filters have been used. Accordingly, the example embodiment is advantageous in more efficiently managing filters than conventional technologies.

Prior to describing the example embodiment in more detail with reference to the drawings, several assumptions made in the example embodiment are first described.

Firstly, the attacking entity 20A has a packet spoofing ability. That is, the attacking entity 20A can spoof an IP source address to make tracking difficult and the defense system useless. Also, the attacking entity 20A has a filter flooding ability. That is, the attacking entity 20A can send forged filters to the filtering routers 10 to make the filtering routers 10 block packets from the legitimate entity 20L, and send many filters to the filtering routers 10 to make a filter storage of the filtering routers 10 being filled with useless filters. Since the filter storage of the filtering routers 10 is a resource in a limited size, the attack of the attacking entity 20A may destroy the defense system of the filtering routers 10.

However, the attacking entity 20A cannot perform a global attack. This is because the attacking entity 20A cannot monitor all packets on all paths of the network. Accordingly, the attacking entity 20A reassembles partial information taken from various paths to use it for attacks. In addition, the attacking entity 20A cannot infect the filtering routers 10 themselves or make forged filtering routers. Even if the attacking entity 2A makes forged filtering routers 10, it is assumed that a network manager can easily detect it.

Meanwhile, it is assumed that the victim entity 20V can monitor traffic patterns to identify attack traffic. Many servers include this function. In addition, it is assumed that in order to paralyze the victim entity 20V, a significantly higher rate of attack flow than legitimate traffic is necessary. That is, it is assumed that pps or bps of attack traffic is higher of pps or bps of legitimate traffic flow.

Now, structures of the filtering routers 10 and the host (e.g.: the legitimate entity 20L or the victim entity 20V, which will be referred to as just a host 20 hereinafter) operating in association with the filtering routers 10 are briefly described. Detailed descriptions in this regard are provided later.

Figure 2:
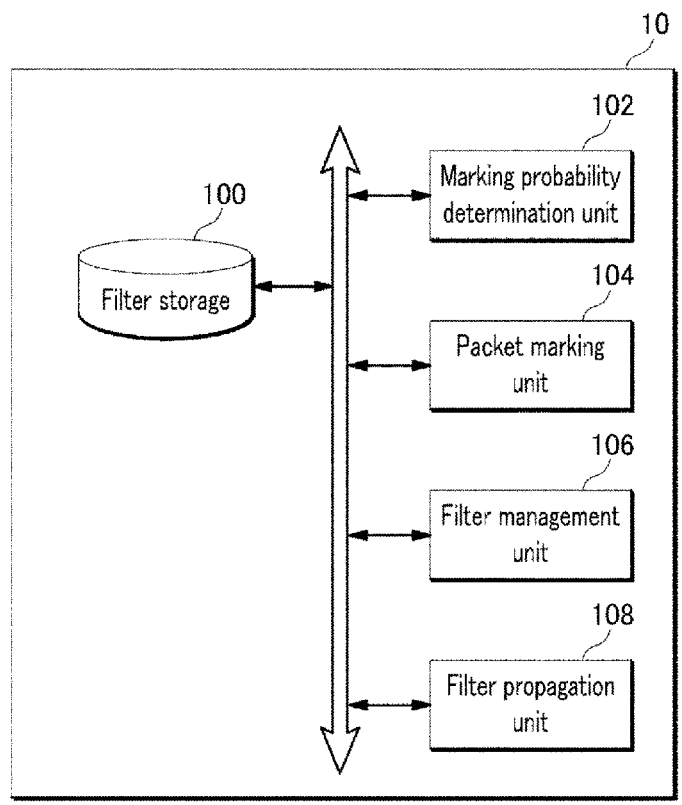
FIG. 2 illustrates a structure of an adaptive probabilistic packet filtering router in accordance with an example embodiment.

FIG. 2 illustrates a structure of an adaptive probabilistic packet filtering router in accordance with an example embodiment.

The filtering routers 10 in accordance with an example embodiment include a filter storage 100, a marking probability determination unit 102, a packet marking unit 104, a filter management unit 106, and a filter propagation unit 108.

The filter storage 100 stores at least one filter. As aforementioned, the filter management unit 106 determines whether to use or priorities for use and whether to drop the filters stored in the filter storage 100 by using the filter scheduling policy. The filter propagation unit 108 propagates filters being used to other filtering routers 10.

The packet marking unit 104 inserts marking information into packets received by the filtering routers 10. The marking information may be generated in various types by using addresses of the filtering routers 10.

The marking information can be used by a device or a router that has received marked packets, i.e., packets into which the marking information has been inserted to obtain the addresses of the filtering routers 10 that had marked the packets. That is, the marking information may be used for identifying the filtering routers 10 located on transmission paths of the packets, and the addresses of the filtering routers 10 obtained from the marking information may be used as destination addresses of filters or filter requests.

The probability that the packet marking unit 104 marks a packet is dynamically set, as described above. More particularly, the packet marking probability is determined by the marking probability determination unit 102 based on the filtering efficiency of the filtering routers 10. As described above, the filtering efficiency can be calculated based on a distance from the packet's transmission source (e.g.: the attacking entity 20A or the legitimate entity 20L), available resources (e.g.: the size of the filter storage 100) of the filtering routers 10, and the number of links of the filtering routers 10.

Figure 3:
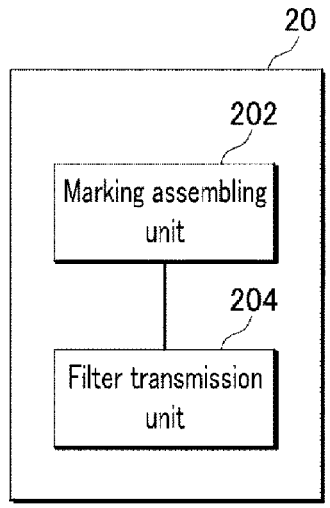
FIG. 3 illustrates a structure of a host operating in association with an adaptive probabilistic packet filtering router in accordance with an example embodiment.

FIG. 3 illustrates a structure of the host operating in association with the adaptive probabilistic packet filtering router in accordance with an example embodiment.

The hosts 20 in accordance with an example embodiment include a marking assembling unit 202 and a filter forwarding unit 204.

The marking assembling unit 202 assembles various types of marking information contained in the received packets. Since the marking information is generated by using the addresses of the filtering routers 10, the hosts 20 can identify the filtering routers 10 by using the assembled marking information.

Accordingly, if the received packets are determined as attack packets, the filter forwarding unit 204 can generate and forward a filter or a filter request to the relevant filtering routers 10.

Now, the adaptive probabilistic packet marking in accordance with an example embodiment is described with reference to FIG. 4 to FIG. 6. These drawings omit legacy routers. Accordingly, filter propagation may be executed via other legacy routers, though they are not illustrated.

Figure 4:
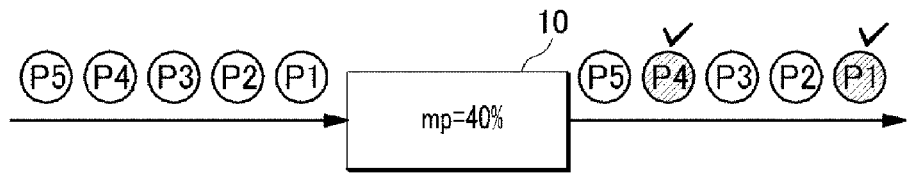
FIG. 4 illustrates a concept of probabilistic packet marking in accordance with an example embodiment.

FIG. 4 illustrates concept of probabilistic packet marking in accordance with an example embodiment.

FIG. 4 illustrates the case where packet marking probability of the filtering routers 10 is 40% (mp=40%). 40% means that when 100 packets are received, marking information is inserted into 40 of the 100 packets. Accordingly, when packets p1, p2, p3, p4 and p5 are received, marking information is inserted into p1 and p4, and thereafter, p1, p2, p3, p4 and p5 are forwarded.

If the packet marking probability is 100% (mp=100%), the filtering routers 10 will insert marking information into all of the received packets and forward the packets. This would be inefficient if most of the packets are legitimate packets. This is because that the resources of the filtering routers 10 are limited, and delay in forwarding packets would occur by the insertion of marking information.

Accordingly, the filtering routers 10 in accordance with an example embodiment probabilistically mark packets. Packet marking probability would either be fixed or variable. Filter propagation speeds when the packet marking probability is fixed and when the packet marking probability adaptively varies based on the filtering efficiency are compared with reference to FIG. 5 and FIG. 6.

Figure 5:
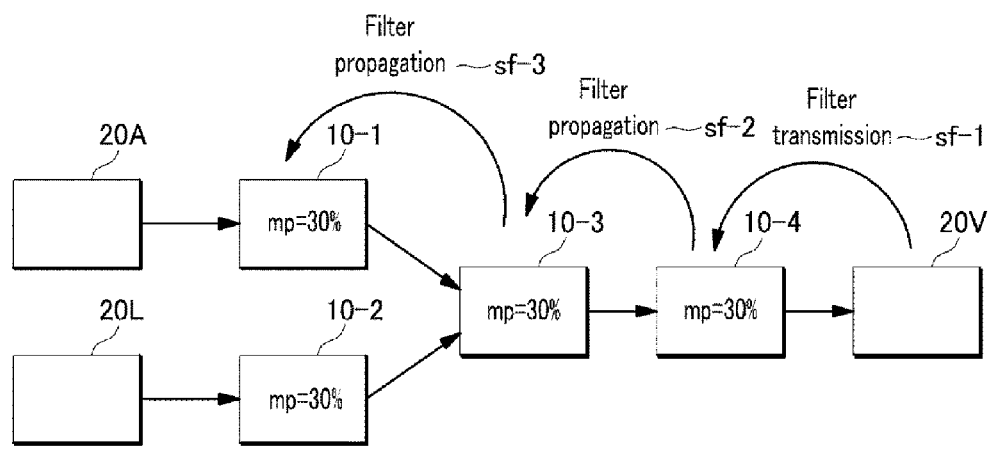
FIG. 5 illustrates an example for conventional fixed probabilistic packet marking.

FIG. 5 illustrates an example for conventional fixed probabilistic packet marking.

When the packet marking probability of each of the filtering routers 10-1, 10-2, 10-3 and 10-4 is fixed to be 30% (mp=30%), the victim entity 20V senses an attack and forwards filters to the filtering router 10-4, which is the closest to the victim entity 20V (sf-1), and the corresponding filtering router 10-4 propagates the filters to the next router 10-3 on an attack path identified using the marking information (sf-2). Only when this process is accomplished once more (sf-3), the filters reach the filtering router 10-1 which is the closest to the attacking entity 20A.

That is, in conventional, fixed probabilistic packet marking, when there are three filtering routers 10 on a path between the attacking entity 20A and the victim entity 20V, filter forwarding and propagation should be accomplished three times so that filters generated in the victim entity 20V against an attack can reach the filtering router 10-1 which is the closest to the attacking entity 20A.

Figure 6:
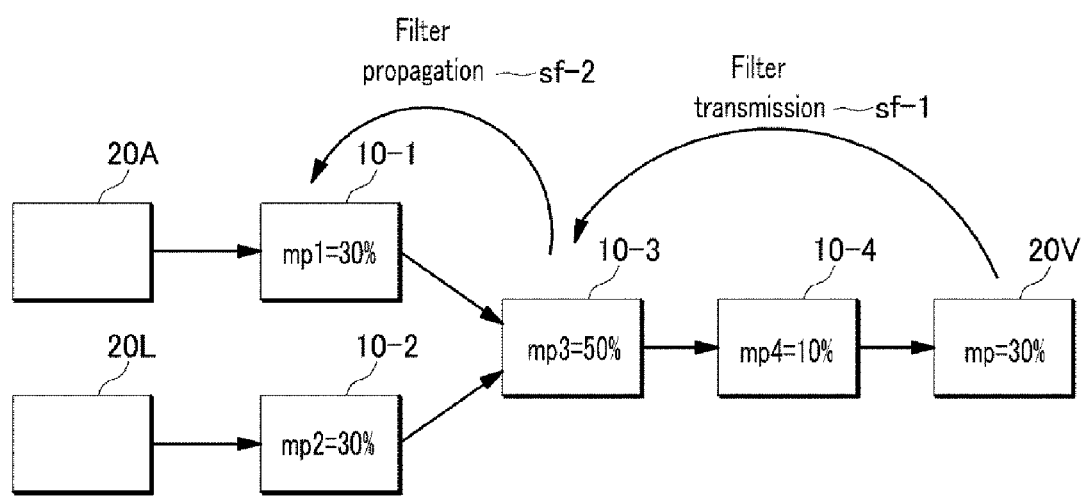
FIG. 6 illustrates an example for adaptive probabilistic packet marking in accordance with an example embodiment.

FIG. 6 illustrates an example for adaptive probabilistic packet marking in accordance with an example embodiment.

The packet marking probabilities of the filtering routers 10-1, 10-2, 10-3 and 10-4 are adaptively set to mp1=30%, mp2=30%, mp3=50% and mp4=10%, respectively, depending on the filtering efficiency thereof. The filtering router to which the victim entity 20A senses an attack and forwards filters is the filtering router 10-3 having high filtering efficiency on an attack path identified using marking information, not the filtering router 10-4 which is the closest to the victim entity 20V (sa-1). When the filter propagation is accomplished only one more time (sa-2), the filters reach the filtering router 10-1 which is the closest to the attacking entity 20A.

That is, in the adaptive probabilistic packet marking in accordance with an example embodiment, when there are three filtering routers 10 on a path between the attacking entity 20A and the victim entity 20V, the number of times for filter forwarding or propagation for enabling filters generated in the victim entity 20V against an attack to reach the filtering router 10-1, which is the closest to the attacking entity 20A, is smaller than that in conventional technologies. Accordingly, when the filtering router 10-1, which is the closest to the attacking entity 20A, requests that the attacking entity 20A no longer forward attack packets, or blocks packets from the attacking entity 20A, the adaptive probabilistic packet marking method in accordance with an example embodiment would block the attack faster than conventional methods.

This is because the packet marking probability of each of the filtering routers 10 is set based on the filtering efficiency of each of the filtering routers 10. For example, since the filtering router 10-3 is closer to the attacking entity 20A and has more links than the filtering router 10-4, the packet marking probability (mp3=50%) set by the marking probability determination unit 102 of the filtering router 10-3 is higher than the packet marking probability (mp4=10%) set by the marking probability determination unit 102 of the filtering router 10-4.

Figure 7:
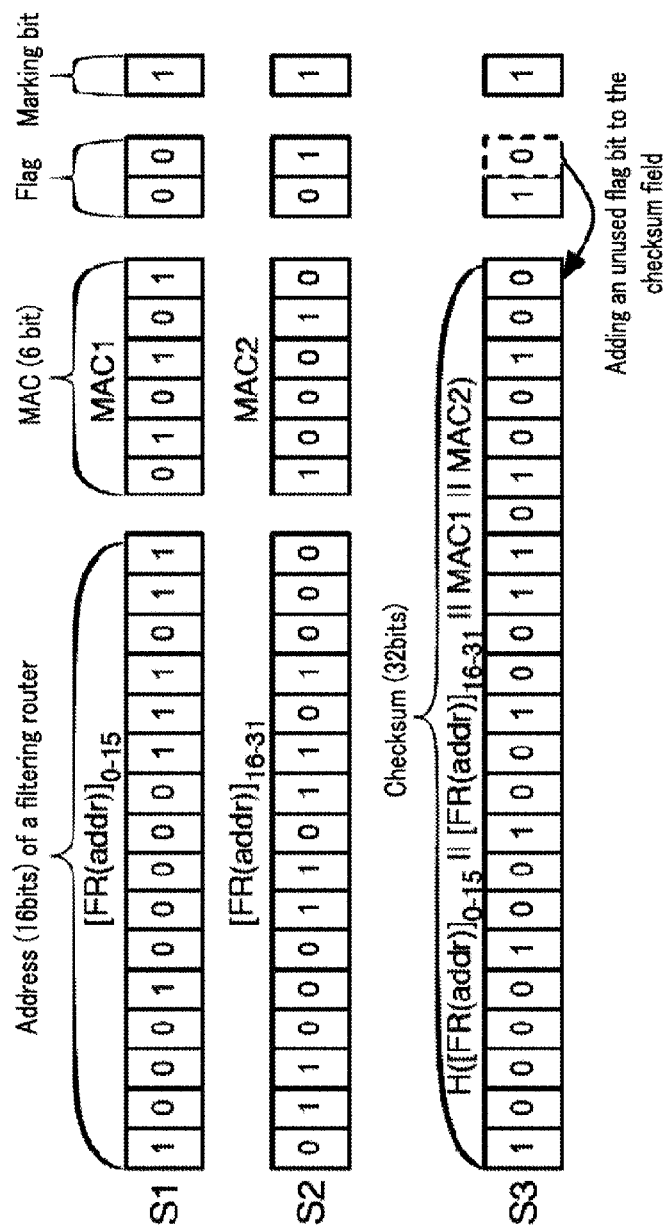
FIG. 7 illustrates an example for packet marking information in accordance with an example embodiment.

FIG. 7 illustrates an example for packet marking information in accordance with an example embodiment.

As described above, the filtering routers 10 in accordance with an example embodiment insert marking information based on addresses of the filtering routers 10 into unused IP header fields of packets. Accordingly, the example embodiment is advantageous in that there is no need to modify an existing protocol. For example, since it is unnecessary to modify payload data of IP packets in order to insert marking information, there is no adverse effect resulting from the circumstance that a legacy router discards without handling or fragments marked packets.

However, there is a problem in that the space of the unused IP header fields is limited. For example, the IPv4 packet does not use 25 bits, while the filtering routers 10 in accordance with an example embodiment require 32 bits for marking the addresses of the filtering routers 10. Accordingly, the packet marking unit 104 of the filtering routers 10 fragments the addresses of the filtering routers 10 into upper 16 bits (FR (add)0-15) and lower 16 bit (FR(add)16-31) bits to generate two types of marking information using the respective bits (S1 and S2, respectively). The hosts 20 can reassemble the received two types of the marking information to obtain the addresses of the filtering routers 10 which inserted the marking information.

Therefore it is necessary to prevent the hosts 20 from incorrectly reassembling the marking information. For example, the hosts 20 should not assemble S1 from the filtering router 10-3 and S2 from the filtering router 10-4.

In order to prevent the incorrect assembling, the packet marking unit 104 of the filtering router 10 uses a checksum (CHK), which is a hash value calculated based on the addresses of the filtering routers 10, and a message authentication code (MAC). The packet marking unit 104 generates 6-bit message authentication codes for S1 and S2, respectively, (MAC1 and MAC2, respectively) by using a secret key of the filtering router 10 for destination IP addresses.

The checksum varies depending on the MAC and constructs a third type of marking information, i.e., S3. As illustrated, the checksum may be generated by the fragmented addresses of the filtering router 10 of S1 and S2 and the message authentication codes for S1 and S2. Here, H( ) means an cryptographic hash function. Since the checksum can use the 1 bit that does not need to be used in the flag (refer to the following paragraph), it can be generated with 23 bits.

Conclusively, the packet marking unit 104 generates three types of marking information as illustrated. The S1 type may include upper 16 bits of the IP address of the filtering router 10 and the message authentication code (6 bits) for S1, while the S2 type may include lower 16 bits of the IP address of the filtering router 10 and the message authentication code (6 bits) for S2. The S3 type may include the checksum calculated using the said information. Each of the marking information includes other information such as a marking bit (1 bit) indicating packet marking information and a flag (2 bits) indicating the type of the marking information. In this way, all of the three types of marking information can be accommodated in total 25 bits of unused IP header fields.

The checksum may be used for verifying the marking information reassembled by the hosts 20. The hosts 20 can generate a second checksum (CHK') from the received S1 and S2 in the same manner as that used by the packet marking unit 104 of the filtering router 10, and verify whether the reassembling has been successfully accomplished by comparing it with the checksum (CHK) included in the received S3. That is, in case of CHK=CHK', the reassembling has been successfully accomplished, and the address of the filtering router 10 located on the transmission path of the received packets has successfully been obtained. Otherwise, the reassembling has been failed.

The example embodiment uses the message authentication code for the following reasons. If the attacking entity 20A is aware of a hash function H( ), the attacking entity 20A can send the correct S3 to the victim entity 20V. Especially, if the number of the filtering routers 10 is small and their packet marking probabilities are low, the packets sent by the attacking entity 20A may not be marked and reach the victim entity 20A. Therefore, in such cases, the attacking entity 20A would be able to hinder marking reassembling by using spoofed markings.

In order to block this, the message authentication code is calculated by using a destination IP address and a secret key of the filtering router 10. Since the message authentication code itself depends on the destination IP address, the attacking entity 20A cannot identify the message authentication code through a technique of making packets come to the attacking entity 20A via the filtering router 10.

However, since the length of the message authentication code is no more than 6 bits, it is necessary to prepare for the cases that the attacking entity 20A sends a number of various message authentication codes by using brute force attacks to hinder the marking reassembling of the victim entity 20V. To this end, the hosts 20 in accordance with an example embodiment use a frequency analysis technique.

The frequency analysis is based on the assumption that occurrence frequency of correct fragments of S1, S2 and S3 is high as the filtering router 10 in accordance with an example embodiment inserts marking information into packets based on adaptive marking probabilities. The host 20 sorts the received S1, S2 and S3 based on their occurrence frequency, and then, reassemble the S1, S2 and S3 fragments whose occurrence frequencies are similar. This is because the number of fragments of S1, S2 and S3 from the same filtering router 10 would be similar, regardless of how many filtering routers 10 exist between the attacking entity 20A and the victim entity 20V and regardless of the packet marking probabilities of the filtering routers 10.

Even if the message authentication code periodically varies, the host 20 can identify a new message authentication code. This is because new message authentication codes will be eventually more than old message authentication codes.

When the reassembling of S1, S2 and S3 which have the highest frequency, is failed, the host 20 resets a count of the corresponding S1, S2 and S3 to 0. This is intended to prevent selecting the same S1, S2 and S3 when next reassembling is attempted.

The above-described packet marking information reassembling and verification may also be used in the filtering router 10 to calculate an address of another filtering router 10, which will propagate filers. For example, the filtering router 10 can obtain an address of a filtering router 10 which is located on a transmission path of attack traffic and closer to the attacking entity 20A, through packet marking information reassembling.

That is, marking information is generated in various types based on the fragmented address of the filtering router 10, such that different types of marking information is inserted into packets, and reassembled and used by the host 20 or another filtering router 10, which receives a series of packets containing the marking information.

When the victim entity 20V receives three types of marking information S1, S2 and S3 associated with traffic flow questioned as attack, the victim entity 20V reassembles and verifies marking information by using the above-described method, and then, transmits a filter request to the corresponding filtering router 10 by using the obtained address of the filtering router 10. The filter request may have a form of Req{A, V, CHK}. That is, the filter request may include attacking entity 20A information, victim entity 20V information and a checksum (CHK).

FIG. 8 illustrates an example for calculating packing marking probability in accordance with an example embodiment.

As described above, the packet marking probability may be adaptively set according to the filtering efficiency of the filtering router 10. That is, the filtering router 10 optimal for blocking a certain network attack can mark packets it receives and forwards with a higher packet marking probability than other filtering routers 10.

As described above for the filtering efficiency, the probability is set depending on how close the filtering router 10 is to the transmitter of the packets, namely, the closer the filtering router 10 is the higher the probability is. Also, the probability is set depending on how many available resources of the filtering router 10, namely, the more resources are available the higher the probability is. And, the probability is set depending on how many links the filtering router 10 has, namely, the more the links are the higher the probability is.

That is, the filtering router 10 inserts marking information about itself into packets with a high probability when the filtering router 10 is close to the attacking entity 20A, there is much space that can store filters, and the number of other connected routers is large. This means that the filtering router 10 can effectively block malicious traffic such as denial-of-service attack traffic.

These standards are expressed as HOP (Hop count from attacker), RES (Resource Availability), and DEG (Link Degree) in the illustrated formulas, respectively.

The HOP calculation formula (e1) shows how hop counts from a transmission source of packets can be calculated based on the TTL value of IP packets. TTL can be used for the HOP calculation because the TTL value decreases every time the packet passes through a router. The hop count h showing how many routers the packet passes through can be calculated through subtraction of current TTL and initial TTL. hmax means a maximum hot count, and it has been known that the maximum hop count between a packet transmission source and a packet receiver in the Internet is generally about 30.

The TTL value varies depending on an operating system of a packet transmission source (e.g.: the attacking entity 20A or the legitimate entity 20L). For example, in case of Unix-based operating systems such as LINUX, the initial TTL value is generally 64, and in case of the Window series, the initial TTL value is 128.

Accordingly, for example, assuming that the initial TTL value is 64 or 128 depending on operating systems, when a TTL value of packets received by the filtering router 10 is 45, it can be inferred that the initial TTL of the corresponding packets will be 64. This is because when the maximum hop count is 30, the initial TTL cannot be 128.

Accordingly, in the filtering router 10 in accordance with an example embodiment, HOP, which shows how close the filtering router 10 is to the attacking entity 20A, can be calculated by using the hop count h, which corresponds to a difference between the current TTL value extracted from the filtering router 10, and the initial TTL value inferred based on the current TTL value, and hmax, which is the maximum hop count.

For example, when the hop count calculated based on TTL is 19, HOP is (32−19)/19, and thus, approximately 0.4.

The RES calculation formula e2 shows an available space of the filter storage 100 of the filtering router 10. Similar to the above-described formula, qmax means the maximum number of filters that the filter storage 100 can store, and q means the number of currently stored filters.

For example, when the maximum number of filters that can be installed in the filtering router 10 is 100, and the number of currently installed filters is 30, RES is (100−30)/100, and thus, 0.7.

The DEG calculation formulae e3 and e4 measure how much important in terms of topology the filtering router 10 is. That is, if a filter is installed in a router which many links are connected to and performs a core role in forwarding traffic, like a Hub router or a core router, malicious traffic will be more effectively blocked. Therefore, the router's DEG value showing the importance of the router should be higher if the filtering router 10 has more links serving as a more important hub in the network.

There are various methods for measuring the DEG value. For example, DEG calculation formula e3 calculates DEG simply by dividing k, which indicates the number of links connected to the filtering router 10, by kavg, which indicates the average number of connected links per filtering router of the network. The number of the connected links may include both the number of incoming links and the number of outgoing links.

As another example embodiment, the formula e4 calculates betweenness centrality of the filtering router 10 on the shortest path of the packet. In the formula, s means a transmission source of the packet, d means a destination of the packet, and m means an intermediate node. When G(s,d) indicates the number of paths from s to d, and G(m; s, d) indicates the number of paths including m from s to d, a rate of the shortest path including m from s to d may be expressed as P(m; s, d)=G(m; s, d)/G(s, d). Therefore, DEG of a filtering router 10 can be calculated by letting m as the filtering router 10.

Since the above example embodiment should know the shortest path in advance, it is not practical. However, when a network manager has knowledge of topology about the shortest path between nodes, DEG can be calculated by using the formula e4.

Finally, the adaptive packet marking probability pa can be calculated by multiplying the three standards, HOP, RES and DEG by weights thereof, i.e., whop, wres, and wdeg, respectively, summing them, and adding them to basic packet marking probability pd.

The whop, wres, wdeg, and pd can be set depending on the network environment. For example, when the importance of all the filtering routers 10 installed in the network in terms of topology is similar, setting low wdeg for the DEG would be effective.

pd may be set to a value between 0.05% and 50%. For example, when whole paths are reconstructed for IP traceback, pd may be set to 0.05%. On the other hand, in case of preventing a denial-of-service attack, the address information of the filtering router 10 becomes more important than the reconstruction of the whole paths and thus, pd may be set to a value between 30% and 50%.

Since pd is important in calculating pa, it is desirable to properly set pd. As a result of experiments, it was shown that the best performance exhibited in case of pd=50%. For example, even when the rate of the filtering router 10 installed in the network is as low as 10%, it was possible to block 80% of attack traffic.

Figure 9:
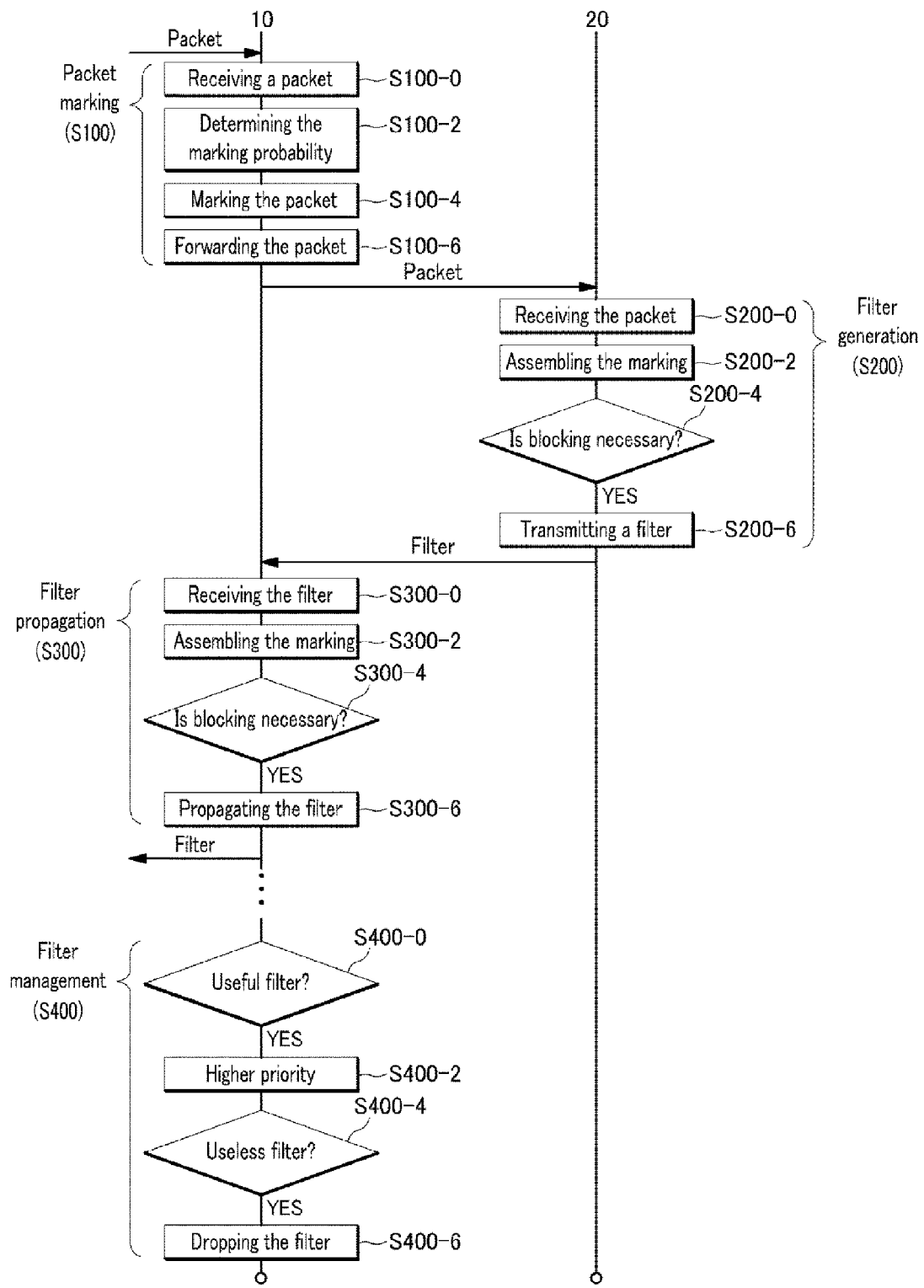
FIG. 9 illustrates flow of an adaptive probabilistic packet filtering method in accordance with an example embodiment.

FIG. 9 illustrates flow of the adaptive probabilistic packet filtering method in accordance with an example embodiment.

The adaptive probabilistic packet filtering method in accordance with an example embodiment largely includes four 4 steps: packet marking (S100), filter generation (S200), filter propagation (S300), and filter management (S400).

As described above, the packet marking (S100) includes inserting marking information into packets (S100-4) received by the filtering router 10 (S100-0) based on the marking probability (s100-2) adaptively determined according to the HOP, RES and DEG, etc., and then, forwarding the packets (s100-5). Since detailed description in this regard has been provided, it is omitted here.

As described above, the filter generation (S200) includes assembling marking for packets received by the host 20 (A200-0) to obtain the address of the filtering router 10 located on a transmission path of the packets (S200-2), and for traffic which needs to be blocked (S200-4), forwarding a filter or a filter request to the corresponding filtering router 10 (S200-6). The drawing illustrates assembling marking for all received packets for convenience in description, but the marking assembling (S200-2) may be executed only for traffic which needs to be blocked. Since detailed description in this regard has been provided, it is omitted here.

As described above, the filter propagation (S300) includes assembling marking for filters received by the filtering router 10 (S300-0) in the same manner as used in the host 20 to obtain an address of a next filtering router 10 located on the transmission path of the attack packets (S300-2), and propagating the filters if the filter propagation is necessary (S300-4). The drawing illustrates assembling marking upon receiving the filters for convenience in description, but the received filters may be stored in the filter storage 100 in association with the filter management step (S400), which will be described later, and then, the marking assembling may be executed only when it is determined that the filters are useful (S300-4). Since detailed description in this regard is similar to the step (S200) executed in the host 20, it is omitted here.

As described above, the filter management (S400) manages the number of filters by using the filter scheduling policy in order to hold the most effective filters.

For simple explanation, when a filter is determined to be useful (S400-0), the priority of the filter is raised (S400-2), and when determined to be useless (S400-4), the filter is dropped, namely, removed from the filter storage 100 (S400-6).

The filter scheduling policy may be similar to a cache page replacement policy, which enables an operating system to retain only the most effective pages in the cache memory. The most widely used cache page replacement policy includes LRU (least recently used) and ARC (adaptive replacement cache). Since ARC is better in performance, the filtering router 10 in accordance with an example embodiment uses the filter scheduling policy based on ARC, making a little change to the ARC since in the network environment malicious codes and the attacking entity 20A may exist.

The filter storage 100 of the filtering router 10 in accordance with an example embodiment can maintain two filter lists: a ghost list and a filter list. The ghost list stores questionable filters, and the filtering router 10 stores received filters in the ghost list first. For convenience in description, the filters stored in the ghost list will be referred to as ghost filters. The filtering router 10 uses only the filters stored in the filter list for blocking traffic.

The filtering router 10 periodically calculate filter scores in consideration of frequency and recency of each filter stored in the ghost list and the filter list to use the scores as a basis for filter management.

A ghost filter with a filter score exceeding a pre-set threshold, i.e., a promotion threshold is promoted to be into the filter list. When the filter list is full, the ghost filters are promoted only when their filter scores are higher than the lowest filter score of the filters stored in the filter list.

That is, instead of promptly installing received filters, the filtering router 10 first store the filters in the ghost list, and then, select ghost filters, which are determined to be useful in consideration of frequency and recency, to store them in the filter list. In this way, only optimum filters can be held.

When letting F frequency score at the time point t for a filter I, and R recency score, F can be calculated by the number of times I has been used, and R can be calculated by $R=(t_c-t_p)$ when $t_c$ is arrival time of the current packet related to I, and $t_p$ is the arrival time of a previous packet. Accordingly, when weights for F and R are wF and wR, respectively, a filter score P(t) of the filter I at the time point t can be calculated by using "$P(t)=wF \times F(t)+wR \times R(t)=wF \times F(t)+wR \times (t_c-t_p)$," where $P(0)=0$.

The filter score may be traced by using a moving average technique. When a window size for calculation of moving average is n, S(t) is a moving average of the filter scores for the filter I during the window, S(t) is calculated by using recent n S(t)s. Accordingly, in an example embodiment, the moving average may be calculated by using "$S(t)=S(t-1)-(P(t-n)/t)+(P(t)/t)-r$." Since the moving average is a well-known technique, detailed description in this regard is omitted.

Here, r is a penalty score that can reduce filter scores, and used for selecting a useless filter that will be ejected from the filter list. By using r, a filter for which S(t) becomes lower than the promotion threshold can be ejected from the ghost list and eventually dropped.

This is an implicit filter dropping method that is executed in the filtering router 10. An explicit filter dropping method, by which the victim entity 20V sends a filter dropping request to the filtering router 10, may be used, but this method is problematic in that it requires a safe channel, in which a key for authentication of a corresponding filter dropping request is set. Accordingly, the filtering router 10 in accordance with an example embodiment automatically drops a filter, for which a filter score is low and thus determined to be useless, without an explicit filter dropping request.

Figure 10:
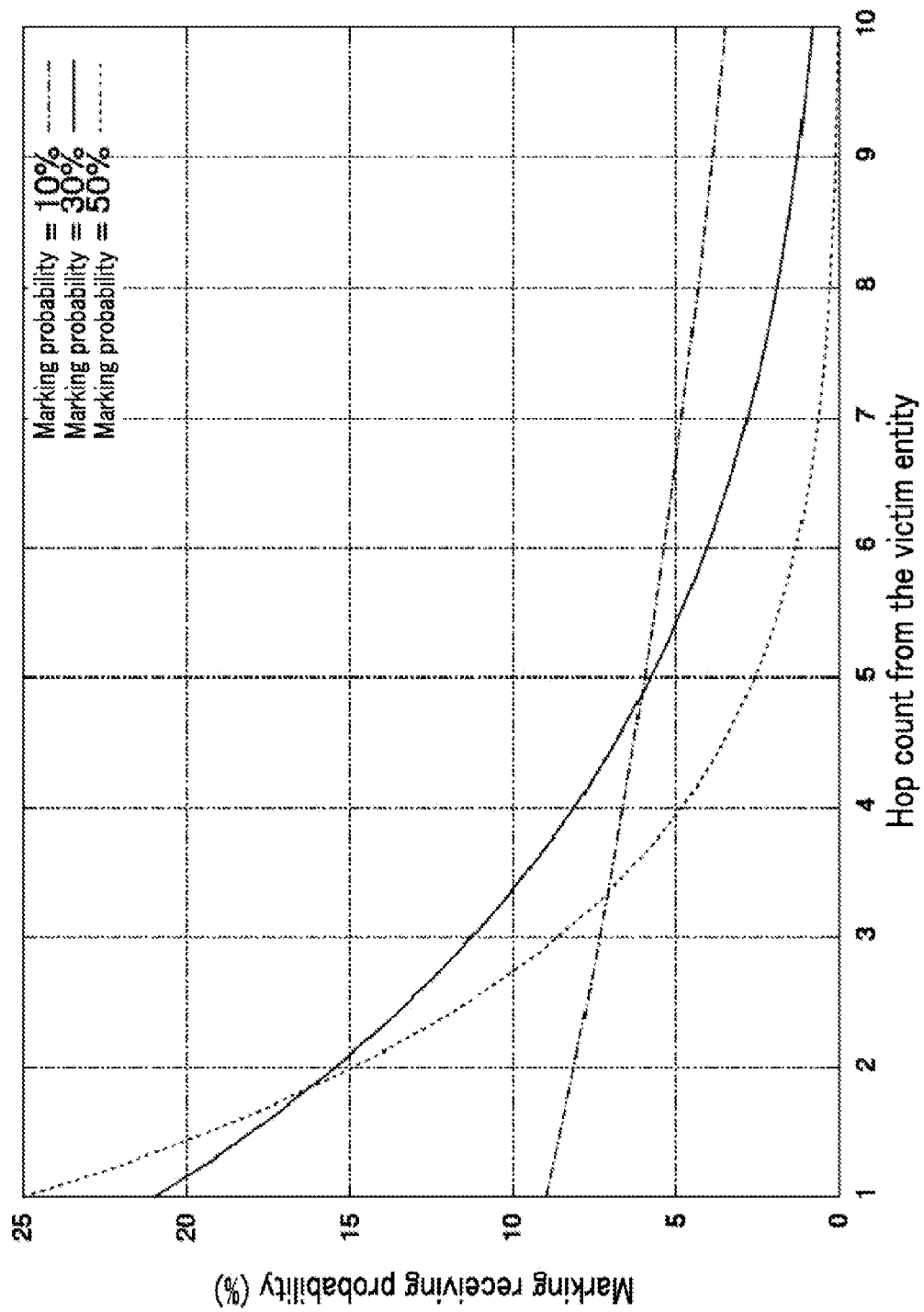
FIG. 10 and FIG. 11 illustrate a graph obtained from analysis of performance of adaptive probabilistic packet filtering in accordance with an example embodiment.
Figure 11:
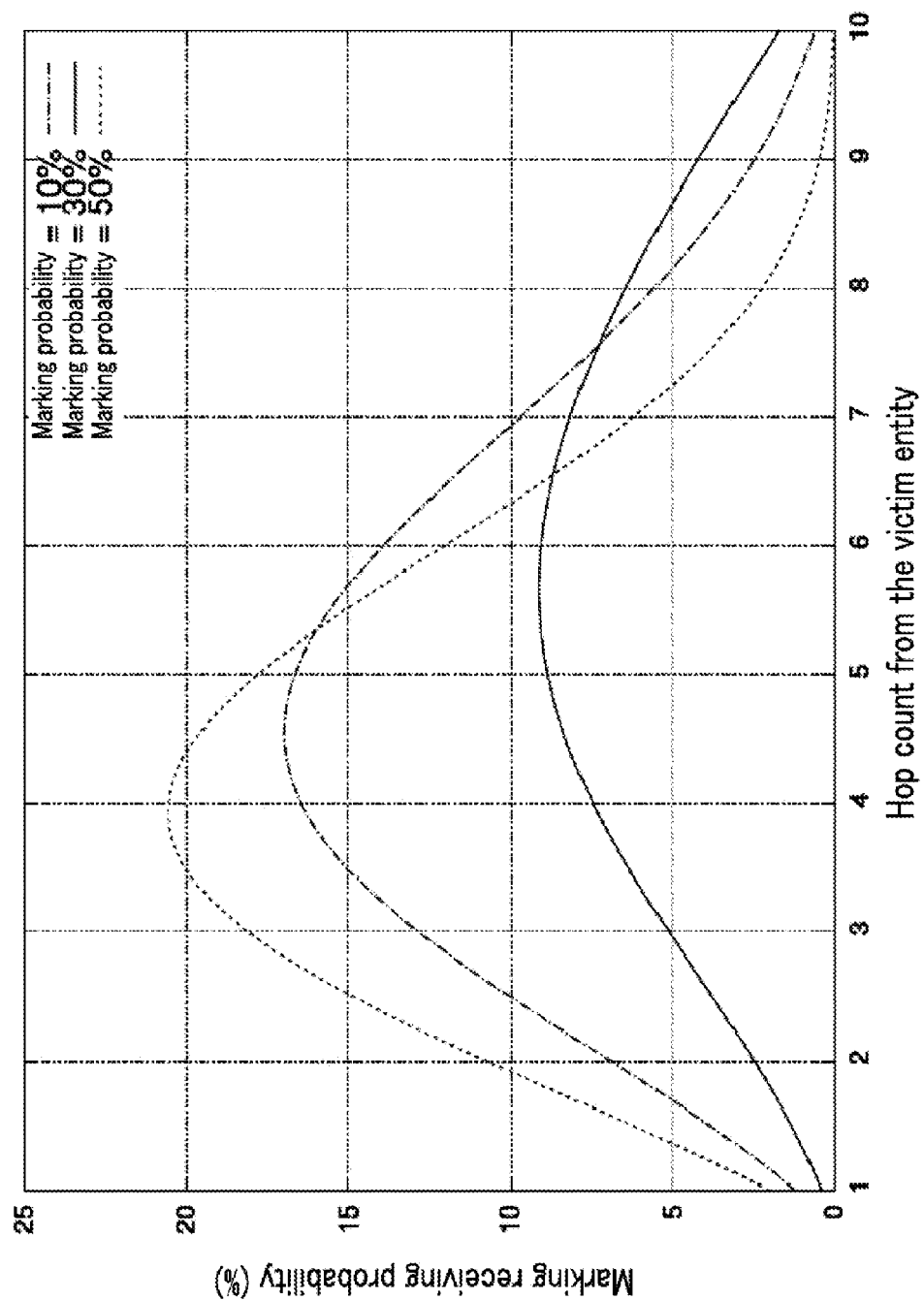

FIG. 10 and FIG. 11 illustrate graphs obtained from analysis of performance of the adaptive probabilistic packet filtering in accordance with an example embodiment, compared to conventional fixed packet marking probability.

By seeing how the probability that the victim entity 20V will receive marking varies depending on the hop count from the victim entity 20V, it can be noticed that the performance of the adaptive probabilistic packet filtering in accordance with an example embodiment is better.

The above description of the example embodiments is provided for the purpose of illustration, and it would be understood by those skilled in the art that various changes and modifications may be made without changing technical conception and essential features of the example embodiments. Thus, it is clear that the above-described example embodiments are illustrative in all aspects and do not limit the present disclosure. For example, each component described to be of a single type can be implemented in a distributed manner. Likewise, components described to be distributed can be implemented in a combined manner.

The scope of the inventive concept is defined by the following claims and their equivalents rather than by the detailed description of the example embodiments. It shall be understood that all modifications and embodiments conceived from the meaning and scope of the claims and their equivalents are included in the scope of the inventive concept.

We claim:

1. A router, comprising:
   a hardware processor configured to calculate filtering efficiency of the router;
   determine a packet marking probability based on the filtering efficiency; and insert marking information generated based on an address of the router into a packet received by the router, depending on the packet marking probability,
   wherein the marking information is used to obtain the address of the router by a device that has received the packet containing the marking information and
   wherein the processor calculates the filtering efficiency based on a distance from a transmission source of the packet, available resources of the router, and the number of links of the router.

2. The router of claim 1, wherein the hardware processor router inserts the marking information into an unused field of an IP header.

3. The router of claim 1, wherein the marking information is generated in multiple types based on a fragmented address of the router, and the marking information is inserted into each packet in one of the multiple types, and the marking information is reassembled for use by a device or another router that has received a series of packets containing the marking information.

4. The router of claim 1, further comprising: a filter storage that stores at least one filter; wherein the hardware processor determines whether to use and whether to drop a filter stored in the filter storage; and
   propagates a filter stored in the filter storage to another router.

5. The router of claim 4, wherein the filter storage comprises: a filter list that stores a filter used for packet blocking; and a ghost list that stores a candidate filter which can be stored in the filter list or be dropped in the future; wherein a filter received by the router is stored in the ghost list, and
   the hardware processor periodically calculates a filter score for each filter stored in the filter storage, and determines whether to move the each filter to the ghost list or whether to move the each filter to the filter list or whether to drop the each filter, based on the filter score.

6. A host device connected to a network comprising a memory and a hardware processor wherein:
   the hardware processor is configured to determine whether a received packet is determined to be a packet of traffic that should be blocked:
   when the received packet is determined to be blocked, identify from marking information contained in the packet a router located on a transmission path of the packet: and
   transmit a filter or a filter request for blocking the traffic to the router,
   wherein the marking information is generated by the router based on an address of the router, according to a packet marking probability that is set by the router based on the router's filtering efficiency calculated by the router,
   and the filtering efficiency is calculated by the router based on a distance from a transmission source of the packet, available resources of the router, and the number of links of the router.

7. The host of claim 6, wherein the host reassembles various types of marking information extracted from a series of packets of the traffic to calculate the address of the router.

8. A method for filtering a packet, comprising:
   calculating filtering efficiency of a router and determining a packet marking probability based on the filtering efficiency;
   inserting marking information generated based on an address of the router into a packet received by the router, based on the packet marking probability;
   receiving, by the router, a filter or a filter request transmitted by a device to the router by using the address of the router calculated based on the marking information;
   blocking, by the router, a packet using the filter;
   propagating, by the router, the filter to another router; and
   determining whether to use or drop the filter,
   wherein the filtering efficiency is calculated based on a distance from a transmission source of the packet, available resources of the router, and the number of links of the router.

* * * * *